United States Patent [19]
Otteson

[11] Patent Number: 5,867,659
[45] Date of Patent: Feb. 2, 1999

[54] METHOD AND APPARATUS FOR MONITORING EVENTS IN A SYSTEM

[75] Inventor: Steven D. Otteson, Pleasant Grove, Utah

[73] Assignee: Intel Corporation, Santa Clara, Calif.

[21] Appl. No.: 671,572

[22] Filed: Jun. 28, 1996

[51] Int. Cl.[6] .................. G06F 11/00; G06F 11/22
[52] U.S. Cl. .................. 395/200.54; 395/184.01; 395/183.15
[58] Field of Search ............ 395/200.53, 200.54, 395/183.13, 183.14, 183.15

[56] References Cited

U.S. PATENT DOCUMENTS

| | | | |
|---|---|---|---|
| 5,261,044 | 11/1993 | Dev et al. | 395/200.54 |
| 5,283,856 | 2/1994 | Gross et al. | 395/51 |
| 5,317,742 | 5/1994 | Bapat | 395/200.53 |
| 5,504,921 | 4/1996 | Dev et al. | 395/200.54 |
| 5,590,056 | 12/1996 | Barritz | 395/183.15 |
| 5,592,620 | 1/1997 | Chen et al. | 395/200.53 |
| 5,619,656 | 4/1997 | Graf | 395/200.54 |
| 5,651,006 | 7/1997 | Fujino et al. | 395/200.53 |
| 5,655,081 | 8/1997 | Bonnell et al. | 395/200.53 |
| 5,682,328 | 10/1997 | Roeber et al. | 395/183.15 |

*Primary Examiner*—Frank J. Asta
*Assistant Examiner*—Ivan C. Pierce, III
*Attorney, Agent, or Firm*—Blakely, Sokoloff, Taylor & Zafman

[57] ABSTRACT

An event log forwarder accesses a set of one or more filters and checks whether a new event in one or more event logs satisfies the set of one or more filters. The event log forwarder also provides an indication if there is a new event which satisfies the set of one or more filters. Additionally, the event log forwarder automatically repeats, at periodic intervals, checking whether a new event in one or more event logs satisfies the set of one or more filters and providing an indication if there is a new event which satisfied the set of one or more filters.

21 Claims, 7 Drawing Sheets

METHOD AND APPARATUS FOR MONITORING EVENTS IN A SYSTEM

BACKGROUND OF THE INVENTION

Field of the Invention

The present invention pertains to the field of computer systems. More particularly, this invention relates to monitoring software applications executing in a computer system.

Background

As technology has progressed, the processing capabilities of computer systems has increased dramatically. This increase has led to a dramatic increase in the types of software applications which can be executed on a computer system, as well as an increase in the functionality of these software applications. The increase in processing capabilities also allows modern computer systems to execute multiple software applications concurrently, such as by including multiple microprocessors in a computer system or by sharing microprocessor time. Additionally, technological advancements have led the way for multiple computer systems, each executing multiple software applications, to be easily connected together via a network.

Many current software applications provide informational codes, referred to as error codes. These error codes are output by the application in response to various conditions. These outputs, referred to as events, can be, for example, errors or potential errors detected by the application, or status information indicating the current operating status of the application. In a network coupling together multiple computer systems with each computer system executing multiple software applications, a substantial number of events can be output by the various applications combined. However, despite the substantial amount of events which can be output in the computer system or network, it is currently difficult to monitor these events to identify a particular event. Monitoring of events can be very important to a user, such as a system administrator, who wishes to monitor the execution of a particular software application(s). Thus, it would be beneficial to provide a mechanism to monitor events in a computer system(s) to identify particular events.

One solution to monitoring events in a computer system is to write events to a log in the computer system and allow the log to be read manually by a user. However, this can be a tedious and time-consuming process for the user, particularly if there are a large number of applications executing concurrently, or if the events being searched for have not, unbeknownst to the searcher, occurred yet. Thus, it would be beneficial to provide a mechanism for automatically monitoring events in a computer system.

Additionally, some events are more important than others, such as indications of serious errors. Given the importance of these events, it would be advantageous to make the user aware of the existence of the event very soon after its occurrence. Thus, it would be beneficial to provide a mechanism for providing a real-time monitor for events in a computer system.

As will be described in more detail below, the present invention provides an event log forwarder to achieve these and other desired results which will be apparent to those skilled in the art from the description that follows.

SUMMARY OF THE INVENTION

An event log forwarder is described herein. The event log forwarder accesses a set of one or more filters and checks whether a new event in one or more event logs satisfies the set of one or more filters. The event log forwarder also provides an indication if there is a new event which satisfies the set of one or more filters. Additionally, the event log forwarder automatically repeats, at periodic intervals, checking whether a new event in one or more event logs satisfies the set of one or more filters and providing an indication if there is a new event which satisfied the set of one or more filters.

In an embodiment of the present invention, the event log forwarder includes a configuration utility and an event monitoring utility. The configuration utility allows a user to set a filter to identify a particular event(s) by selecting a particular event(s) corresponding to a particular application (s) executing on a computer system which is to be monitored. The event monitoring utility periodically checks the event log for new events which satisfy the filter.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is to be appreciated that throughout the present invention, discussions utilizing terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides an event log forwarder for use in a computer system. The event log forwarder includes a configuration utility and an event monitoring utility. The configuration utility allows a user to set a filter to identify a particular event(s). The configuration utility allows selection of a particular event(s) corresponding to a particular application(s) executing on a particular computer system(s) which is to be monitored. The event monitoring utility periodically checks an event log on the computer system for new events which satisfy the filter. If a new event is found which satisfies the filter, then the event monitoring utility forwards an indication of the new event to control logic coupled to the computer system.

Figure 1:
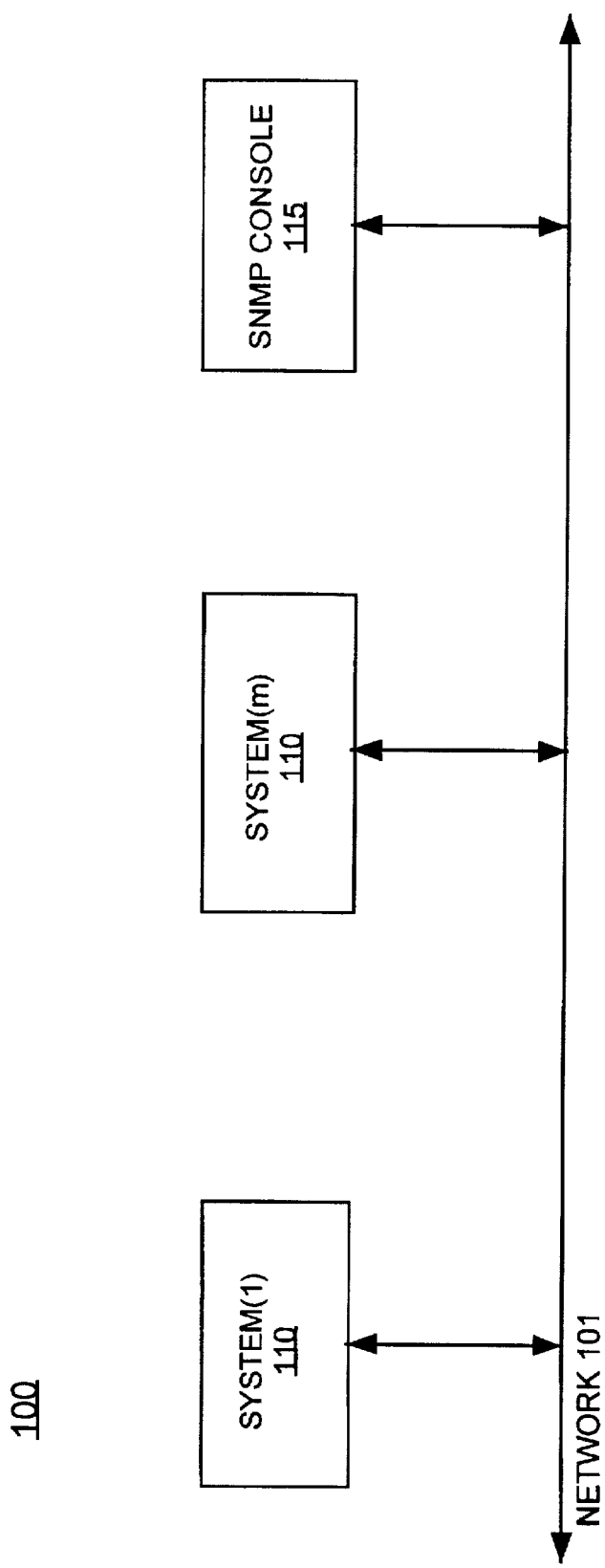
FIG. 1 is a block diagram of a network system such as may be used with one embodiment of the present invention.

FIG. 1 is a block diagram of a network system such as may be used with one embodiment of the present invention. The network system 100 includes multiple (m) computer systems 110 coupled to a network 101. In one embodiment, the network 101 is a Windows®NT network, using the Windows NT operating system, available from Microsoft Corporation of Redmond, Wash. It is to be appreciated that any number of computer systems can be coupled to the network 101. In one embodiment, each computer system 110 operates according to the Windows®NT operating system.

A Simple Network Management Protocol (SNMP) console 115 is also coupled to the network 101. The SNMP console 115 provides user access to the network 101, typically for system administration purposes. According to one embodiment of the present invention, the SNMP console 115 operates according to SNMP version 2, still in draft status.[1]

[1] See, SNMPv2 Working Group, Case, J., McCloghrie, K., Rose, M., and Waldbusser, S., "Introduction to Community-based SNMPv2", Request for Comments 1901, January 1996; SNMPv2 Working Group, Case, J., McCloghrie, K., Rose, M., and Waldbusser, S., "Structure of Management Information for Version 2 of the Simple Network Management Protocol (SNMPv2)", Request for Comments 1902, January 1996; SNMPv2 Working Group, Case, J., McCloghrie, K., Rose, M., and Waldbusser, S., "Textual Conventions for Version 2 of the Simple Network Management Protocol (SNMPv2)", Request for Comments 1903, January 1996; SNMPv2 Working Group, Case, J., McCloghrie, K., Rose, M., and Waldbusser, S., "Conformance Statements for Version 2 of the Simple Network management Protocol (SNMPv2)", Request for Comments 1904, January 1996; SNMPv2 Working Group, Case, J., McCloghrie, K., Rose, M., and Waldbusser, S., "Protocol Operations for Version 2 of the Simple Network Management Protocol (SNMPv2)", Request for Comments 1905, January 1996; SNMPv2 Working Group, Case, J., McCloghrie, K., Rose, M., and Waldbusser, S., "Transport Mappings for Version 2 of the Simple Network Management Protocol (SNMPv2)", Request for Comments 1906, January 1996; SNMPv2 Working Group, Case, J., McCloghrie, K., Rose, M., and Waldbusser, S., "Management Information Base for Version 2 of the Simple Network Management Protocol (SNMPv2)", Request for Comments 1907, January 1996; and SNMPv2 Working Group, Case, J., McCloghrie, K., Rose, M., and Waldbusser, S., "Coexistence between Version 1 and Version 2 of the Internet-standard Network Management Framework", Request for Comments 1908, January 1996.

Figure 2:
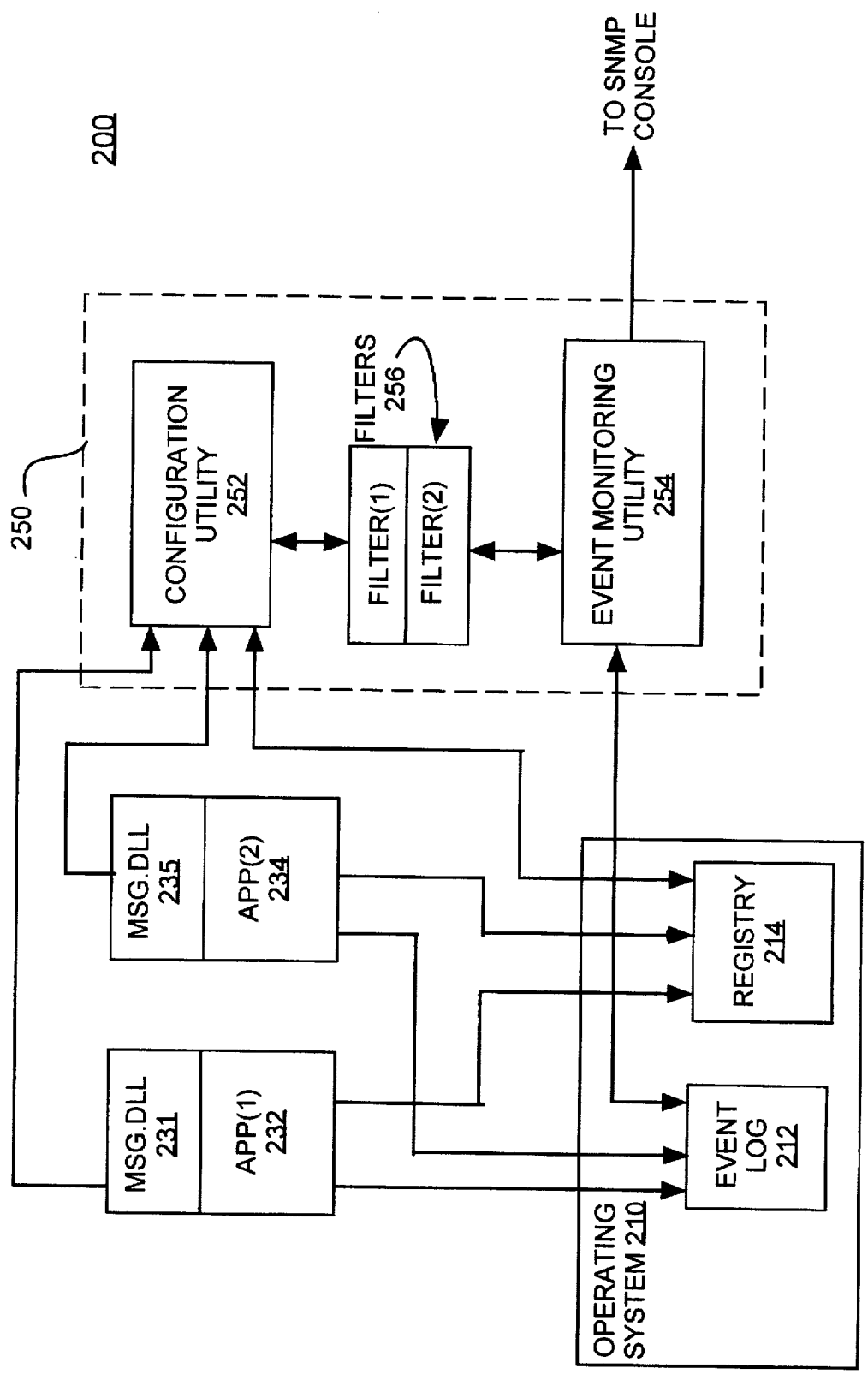
FIG. 2 is a block diagram illustrating a computer system according to one embodiment of the present invention.

FIG. 2 is a block diagram illustrating a computer system according to one embodiment of the present invention. The computer system 200 executes the Windows®NT operating system 210, which includes an event log 212 and a registry 214. The operating system 210 controls the execution of applications on the system 200 and also controls resource allocation in the system 200.

Computer operating systems are well known in the art and thus will not be discussed further, except as they pertain to the present invention.

Two software applications 232 and 234 are shown executing on the computer system 200. Each software application 232 and 234 is a sequence of instructions to be executed by the computer system 200. It is to be appreciated that although only two applications are shown, any number of applications can be executing on the system 200. Application 232 and application 234 each includes a message dynamic link library (msg.dll) 231 and 235, respectively. Each msg.dll 231 and 235 provides a mapping of error codes to error messages for its corresponding application. Thus, for example, if the application 232 outputs an error code, the msg.dll 231 can be accessed by the operating system 210 to obtain an error message corresponding to the output error code. It is to be appreciated that the msg.dll's for different software applications executing on the system 200 can be the same, similar, or completely different.

In the discussions to follow, reference is made to the application 232. However, it is to be appreciated that the discussions below regarding the application 232 apply analogously to any software application which can be executed on the computer system 200.

When the application 232 begins execution on the system 200, the application 232 registers with the registry 214. As part of this registration process, the application 232 provides a pointer to, or other indication of, the msg.dll 231. For example, a pointer to the msg.dll 231 may indicate the location on a mass storage device, such as the filename of a file on a hard disk, of the computer system where the msg.dll 231 is stored. The same registration process is undergone by each application when it begins execution on the system 200. Thus, the registry 214 of the operating system 210 maintains a record of where the msg.dll for each application executing on the system 200 is located.

Additionally, the application 232 can write to the event log 212. By way of example, each time the application 232 detects a condition such as an error or potential error, the application 232 writes an event record in the event log 212. This event record includes the message of one of the event messages stored in the msg.dll 231. In one embodiment, the event log 212 includes, as part of each record, the source of the message, the message provided by the application 232, and a severity indication of the message which is also provided by the application 232. The source of the message is recorded by the operating system 210 and written to the event log 212. Alternatively, the application 232 can write an indication of itself to the event log 212 as part of the event record.

Although only event log 212 and registry 214 are shown in FIG. 2, it is to be appreciated that multiple event logs and registries can be supported in an analogous manner by the operating system. For example, in one embodiment the operating system 210 includes three event logs: an Application event log, a Security event log, and a System event log. In this embodiment, the operating system 210 also includes three registries, one corresponding to each of the event logs. When an application begins execution on the system 200, the application registers with one of the event logs and, when appropriate, writes an event record to the corresponding event log.

The system 200 also includes an event log forwarder 250. The event log forwarder 250 includes a configuration utility 252, an event monitoring utility 254, and filters 256. Upon execution of the event log forwarder 250, the configuration utility 252 accesses the registry 214 to obtain the pointers to the msg.dll's 231 and 235. The configuration utility 252 then accesses each msg.dll 231 and 235 to obtain a list of all messages which can be written to the event log 212 by application 232 and 234, respectively. In one implementation, the configuration utility 252 accesses the registry 214 by sending a message to the operating system 210 requesting a listing of the pointers for the msg.dll's of each application registered in the registry 214. Upon receipt of the list of pointers, the configuration utility 252 uses the pointers to directly access the msg.dll's 231 and 235.

In one embodiment of the present invention, in a network system with multiple computer systems 200, the configuration utility 252 accesses only the registry 214 of its own system. The registries of other systems 200 are not accessed. However, in an alternate embodiment of a networked system with multiple computer systems 200, the configuration utility 252 accesses the registry 214 of each system 200 coupled to the network. Thus, in this alternate embodiment, the configuration utility 252 obtains a list of all messages which can be written to any event log 212 by any application executing on a computer system in the network.

The configuration utility 252 also provides an interface, discussed in more detail below with reference to FIG. 3, for a system user to input selections of specific events to be monitored. One or more sets of criteria, also referred to as filters, are generated, based on the user input, and stored as filters 256. The filters 256 provide an identification to the event monitoring utility 254 of which events in the system 200 are being searched for, as discussed in more detail below. Filters 256 can include multiple search criteria corresponding to multiple events or multiple conditions to be satisfied.

In one embodiment of the present invention, the filters 256 can identify a particular event log, a particular source, and a particular message. The identification of a particular event log indicates which event log of a given computer is to be monitored for events. For example, the filters 256 could indicate all event logs, or alternatively a particular event log. The identification of a particular source indicates which application is to be monitored. For example, the filters 256 could indicate all applications executing on the computer system, or alternatively a specific application executing on the computer system. The identification of a particular message indicates which messages are being searched for. For example, the filters 256 could indicate all messages, or a particular one or more messages.

In one embodiment, one or more of the filters 256 also includes a severity indication, such as "Informational", "Warning", or "Error". This severity is indicated as part of the records in the event log 212 and is provided by an application when it writes a record to the event log 212.

The filters 256 can include both inclusive and exclusive filters. By way of example, one filter of the filters 256 may indicate to include all messages with any severity from the Intel Server Monitor (a particular application running on the computer), and a second filter may indicate to exclude all messages with a severity of "Informational" from the Intel Server Monitor. Thus, in this example, all messages written to the event log in the Intel Server Monitor which did not have a severity of "Informational" would be identified.

The event monitoring utility 254, upon beginning execution, begins accessing the event log 212 at periodic intervals. The event monitoring utility 254 periodically checks whether any new events have been written to the event log 212 which satisfy the search criteria of the filters 256. A new event refers to any event which has been written to the event log 212 since the last time the event monitoring utility 254 checked the event log 212. In one embodiment, a new event satisfies the search criteria of the filters 256 if all of the filters match the event record of the new event. In an alternate embodiment, a new event satisfies the search criteria if the criteria of any one or more of the filters match the event record of the new event.

In one embodiment, the periodic interval used by the event monitoring utility 254 is twenty seconds, however, it is to be appreciated that other intervals can also be used. Typical values for this periodic interval range from fifteen to sixty seconds.

In one embodiment, the event monitoring utility 254 accesses the event log 212 by sending a message to the operating system 210 requesting an identification of events which have been written to the event log 212 in the past twenty seconds (or other interval, as discussed above). In one implementation, these event records are provided to the event monitoring utility 254 by the operating system 210. The event monitoring utility 254 determines which event log 212 to access based on the search criteria of the filters 256. In an alternate embodiment, the event monitoring utility 254 sends the search criteria of the filters 256 to the operating system 210 and the operating system 210 compares the events in the event log 212 to the search criteria.

If the event monitoring utility 254 identifies an event record which satisfies the filters 256, then the event monitoring utility 254 outputs an indication of the event record to an SNMP console. The SNMP console is discussed in more detail below with reference to FIG. 4. In one embodiment, this indication is a trap which includes the event record received from the event log 212. However, it is to be appreciated that other conventional indications could also be used.

In alternate embodiments of the present invention, the event monitoring utility 254 generates an interrupt on the computer system 200 upon detecting a new event record that satisfies the filters 256. The event record of the new event can then be output to the user of the system 200, such as by displaying the event record on a display device. Thus, in this embodiment, additional control logic external to the computer system 200 is not necessary to handle the output of the event monitoring utility 254.

Figure 3:
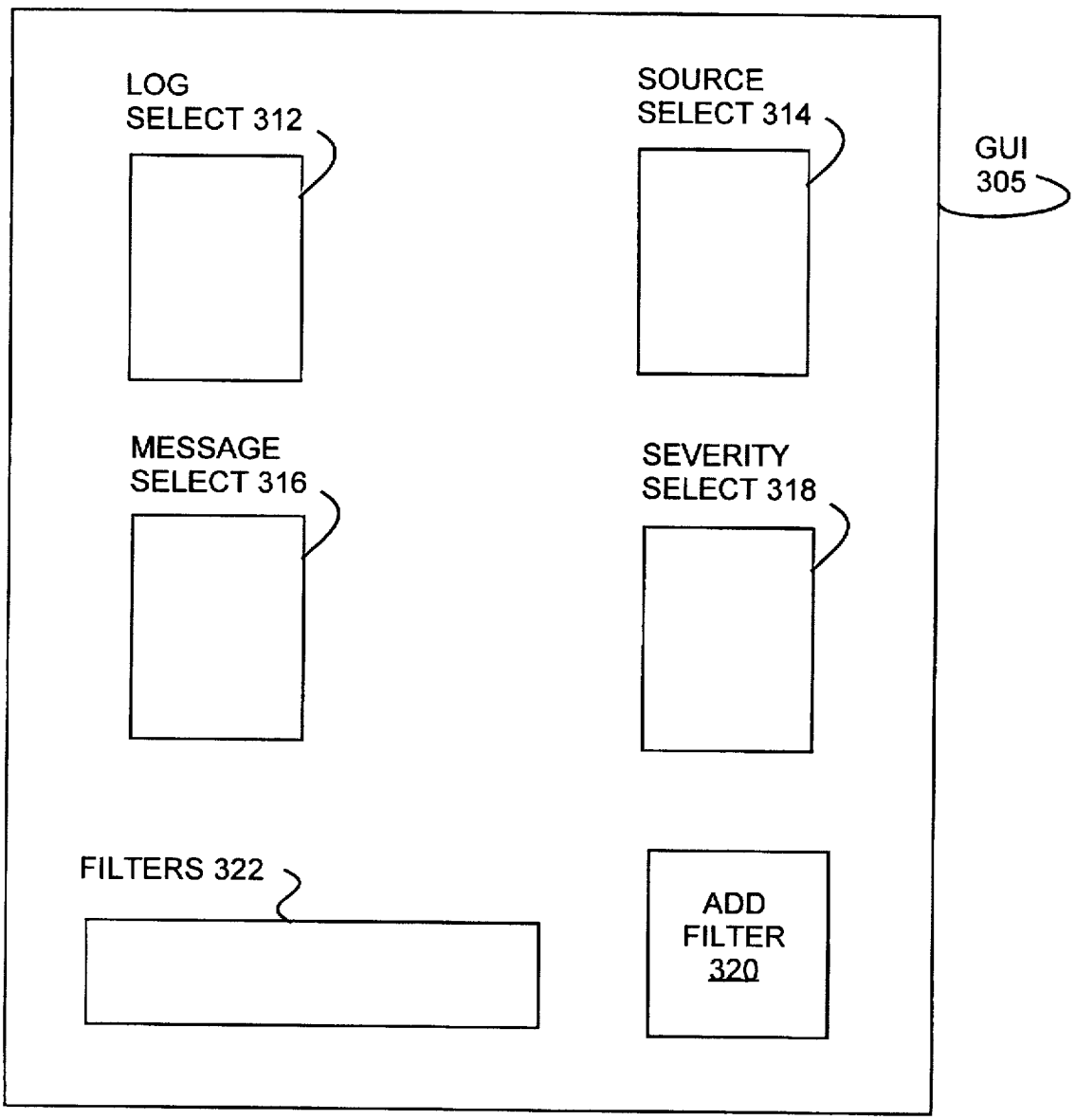
FIG. 3 is a block diagram illustrating an interface according to one embodiment of the present invention.

FIG. 3 is a block diagram illustrating an interface according to one embodiment of the present invention. The interface 305 is a graphical user interface (GUI) provided by the configuration utility 252 of FIG. 2 which allows a user to select particular search criteria for the filters 256. The interface 305 includes a log select 312, a source select 314, a message select 316, a severity select 318, and an add filter option 320.

Upon execution of the configuration utility 252, the GUI 305 is displayed to the user. The log select 312 includes a list of the event logs on the computer system which can be monitored. For example, Application, Security, and System event logs may be listed on log select 312. A particular one or more of the event logs in the log select 312 can be selected by the user in any of a wide variety of conventional manners, such as clicking with a pointer (or similar pointing device) to highlight the desired log. In one implementation, the log select 312 also includes an "all logs" option.

The source select 314 includes a list of the message sources which can be monitored. In one embodiment, the source select 314 lists the software applications on the computer system which correspond to the event log selected from the log select 312. One or more of the listed software applications can be selected by a user from the source select 314 in the same manner as discussed above regarding selection of a log from log select 312. In one implementation, the source select 314 also includes an "all applications" option.

The message select 316 provides a list of the messages which can be monitored. In one embodiment, the message select 316 lists the messages corresponding to the software applications selected form the source select 314. Alternatively, any messages which could be generated by any software application executing on the computer system in the network could be listed in the source select 314. One or more of the listed messages can be selected by a user from the message select 316 in the same manner as discussed above regarding selection of a log from log select 312. In one implementation, the message select 316 also includes an "all messages" option.

The severity select 318 provides a list of the messages which can be monitored. In one embodiment, the severity select 318 lists the possible severities for messages corresponding to the software applications selected form the source select 314. Alternatively, any severity which could be generated by any software application executing on the computer system in the network could be listed in the severity select 318. One or more of the listed severities can be selected by a user from the severity select 318 in the same manner as discussed above regarding selection of a log from log select 312. In one implementation, the severity select 318 also includes an "all severities" option.

In one embodiment, when all of the selections for a particular filter have been made by a user, the user can activate the add filter option 320. In one implementation, the add filter option 320 is an on-screen button which can be clicked on with a pointing device in a conventional manner. Upon activating the add filter option 320, the configuration utility 252 adds the selections as an additional filter to the filters 256.

In one embodiment, the GUI 305 also includes a filters list 322. The filters list 322 provides a listing of all the filters 256. In one implementation, a particular filter can be deleted by pressing a delete key on an alphanumeric input device while the particular filter is highlighted in filters list 322.

It is to be appreciated that although the discussions above describe a graphical user interface, any of a wide variety of conventional interfaces which allow a user to select search criteria for the filters can be used with the present invention. For example, the GUI 305 discussed above could be replaced with a conventional command line interface.

Figure 4:
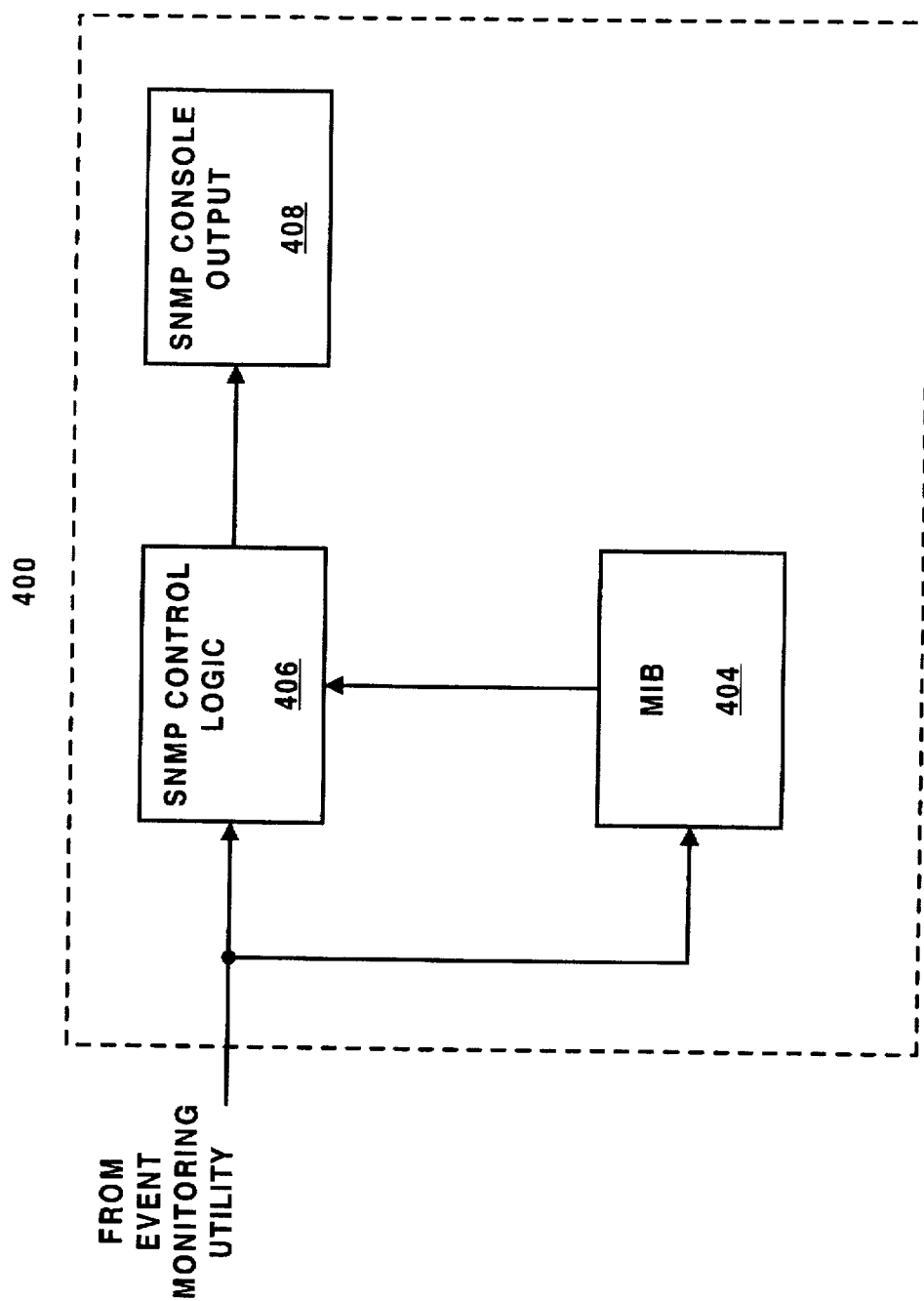
FIG. 4 is a block diagram of a Simple Network Management Protocol (SNMP) console such as may be used with one embodiment of the present invention.

FIG. 4 is a block diagram of an SNMP console such as may be used with one embodiment of the present invention. The SNMP console 400 receives an indication from the event monitoring utility 254 whenever the event monitoring utility identifies a new event that satisfies the criteria of the filters 256. In one embodiment, this indication is a trap which includes the event record identified by the event monitoring utility 254.

The SNMP control logic 406 receives the trap and indicates to the SNMP console output 408 to provide an output indicating the existence of the trap. The Management Information Base (MIB) 404 also receives the indication from the event monitoring utility 254 and decodes the trap. The MIB 404 maintains a correspondence between possible traps which could be received and their variables. Therefore, when a trap is received, the MIB 404 provides an indication to the SNMP control logic 406 of what variables the trap has.

The SNMP console output 408 provides an audio output upon receipt of the indication from the SNMP control logic 406. This audio output can be any of a wide range of outputs, such as a simple beep or the playing of a wave (WAV) file. In alternate embodiments, the SNMP console 400 can provide an indication of the event record in other manners. For example, the SNMP console 400 may not include a visual display or an audio output, but rather provide a hard copy output (such as using a plotter or printer), or store the message in a storage device, such as a fixed or removable magnetic or optical disk, or a flash memory device.

It is to be appreciated that the SNMP console 400 is only one example of control logic which can receive the message indication from the event monitoring utility 254. Any of a wide variety of conventional control logic could be used to provide a visual, audio, or other indication of the message.

Figure 5:
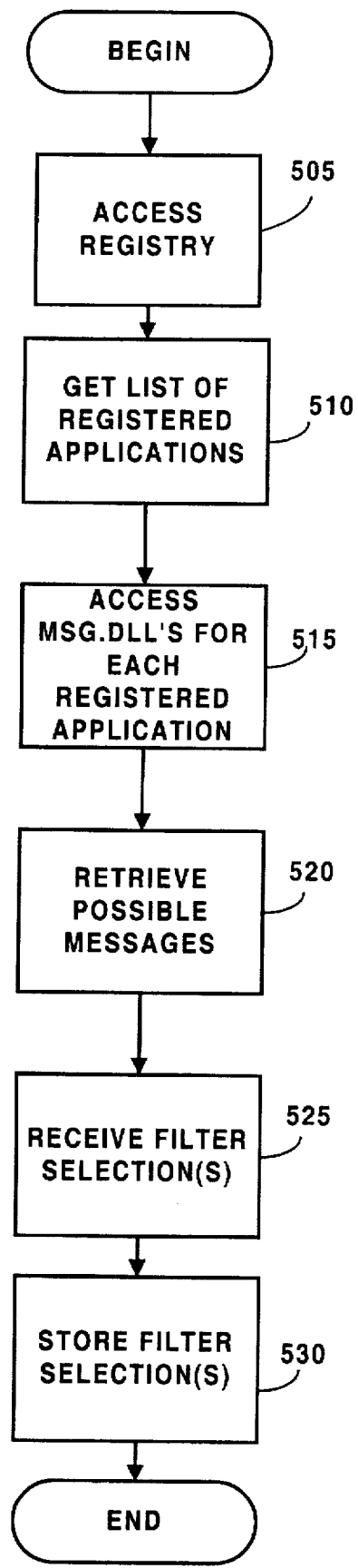
FIG. 5 is a flowchart illustrating the steps followed in generating filters according to one embodiment of the present invention.

FIG. 5 is a flowchart illustrating the steps followed in generating filters according to one embodiment of the present invention. Upon beginning execution of the configuration utility, the configuration utility accesses the registry of the system on which the configuration utility is being executed, step 505. The configuration utility obtains a list of software applications registered on the computer system, step 510. The configuration utility then accesses the msg.dll for each registered software application, step 515, and retrieves the possible messages from each msg.dll, step 520.

The configuration utility receives the filter selections, step 525. In one implementation, these selections are received from a system user. The configuration utility then stores the filters which include the received selections, step 530. Once the filters are stored, they can be accessed by the event monitoring utility, as discussed below.

In an alternate embodiment, the steps 505–520 are repeated for each computer system in the network. Thus, in this alternate embodiment, the possible messages from each msg.dll for each software application registered on each computer system in the network are retrieved.

Figure 6:
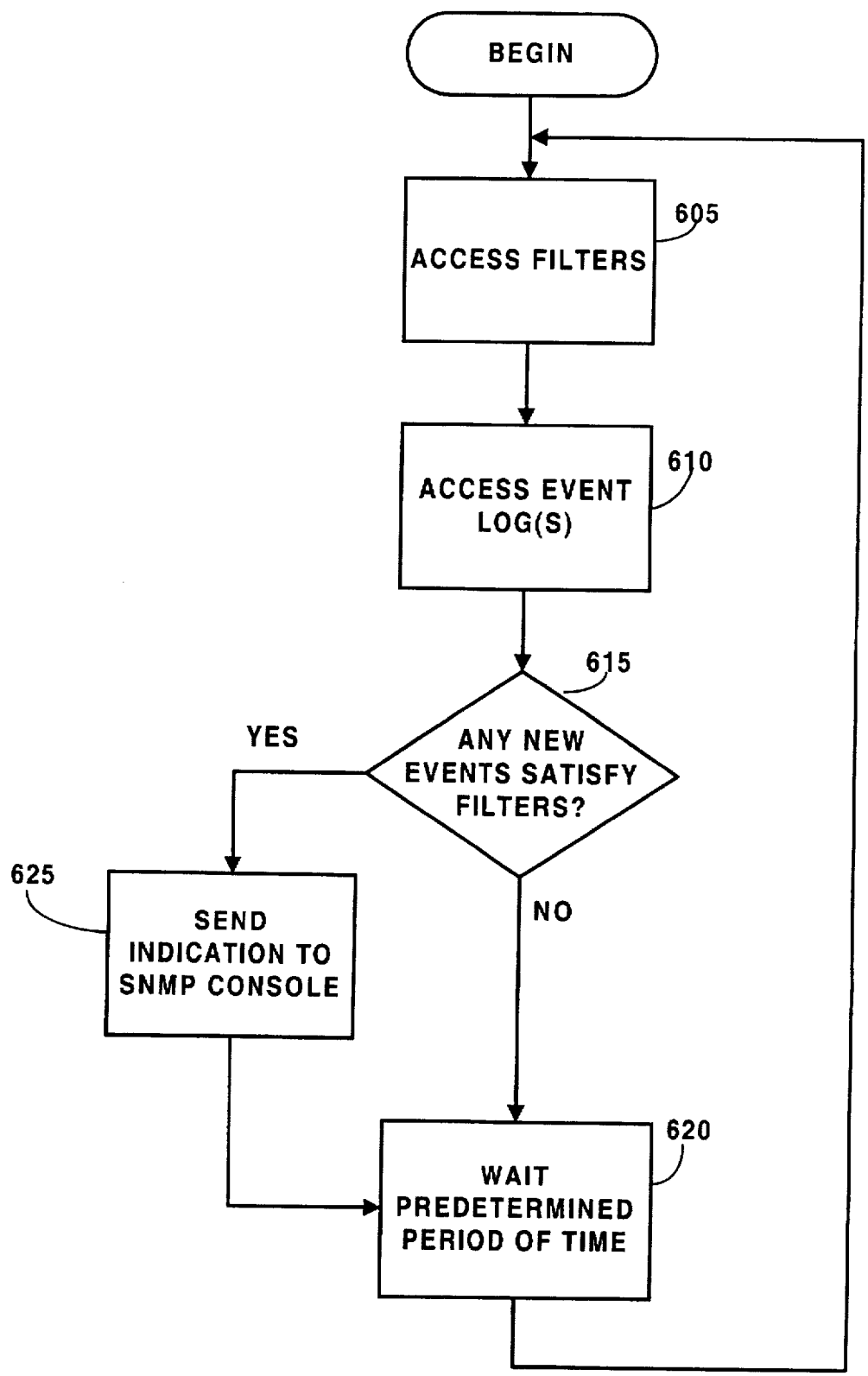
FIG. 6 is a flowchart illustrating the steps followed in monitoring events according to one embodiment of the present invention.

FIG. 6 is a flowchart illustrating the steps followed in monitoring events according to one embodiment of the present invention. Once the filters have been selected, the event monitoring utility begins execution. The event monitoring utility first accesses the filters, step 605, and then accesses the event log(s) indicated by the filters, step 610. The event monitoring utility compares the new events (if any) to the filters to determine whether any of the new events satisfy the filters, step 615. If none of the new events satisfy the filters, then the event monitoring utility waits a predetermined period of time, step 620, then re-accesses the filters, step 605. However, if the event monitoring utility determines there is a new event(s) that satisfies the filters in step 615, then the event monitoring utility sends an indication of the event(s) to the SNMP console, step 625. The event monitoring utility then waits a predetermined period of time, step 620, then re-accesses the filters, step 605. By re-accessing the filters, the event monitoring utility can continually check for changes to the filters.

In an alternate embodiment of the present invention, the event monitoring utility, after waiting the predetermined period of time in step 620, re-accesses the event log(s), step 610 without re-accessing the filters (step 605). Thus, in this alternate embodiment, the event monitoring utility does not continually check for changes to the filters.

Figure 7:
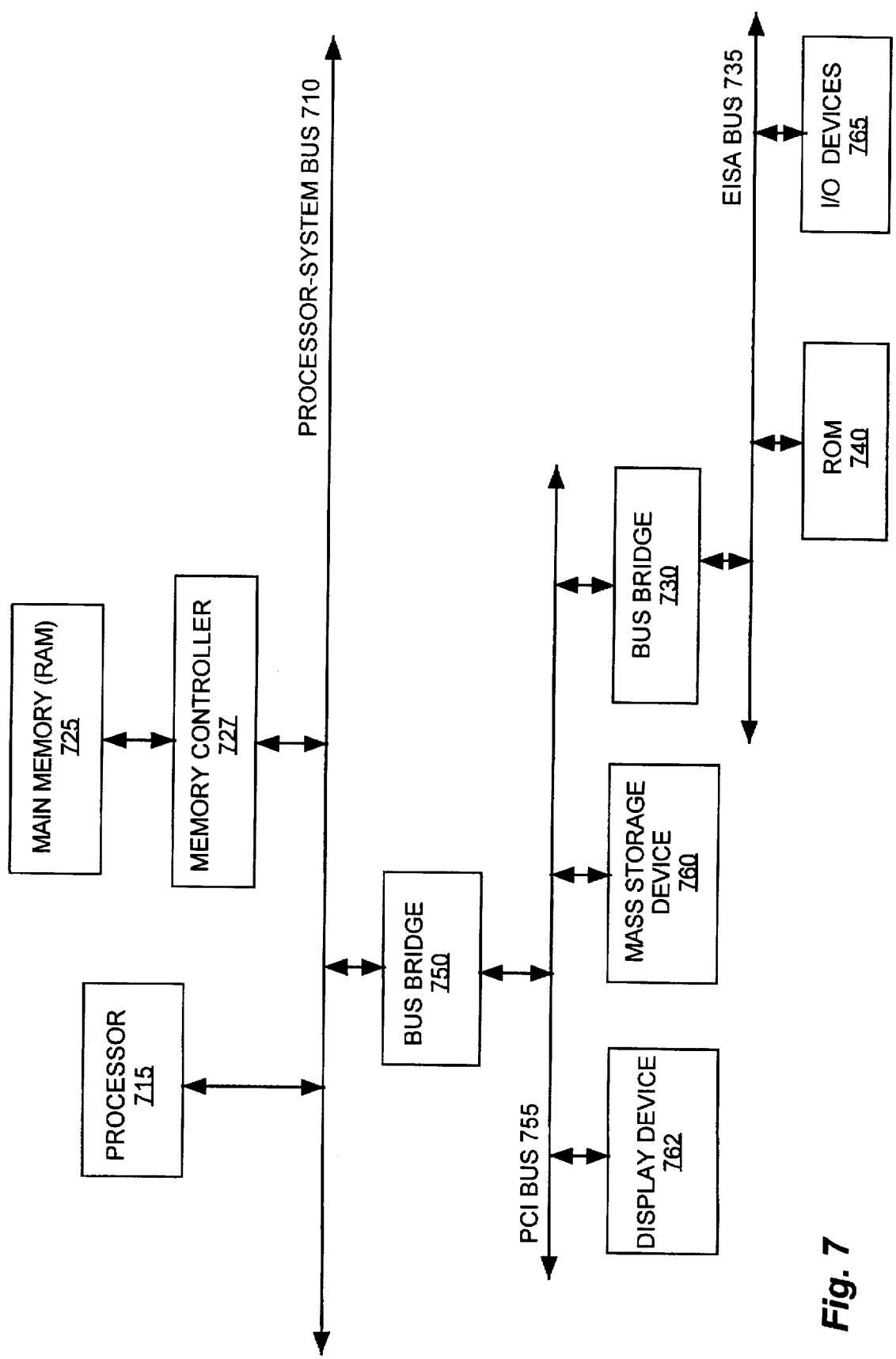
FIG. 7 is a block diagram of a computer system such as may be used with the present invention.

FIG. 7 is a block diagram of a computer system such as may be used with the present invention. In one embodiment, the system 110 of FIG. 1 is a computer system 700. The computer system 700 is shown comprising a processor-system bus or other communication device 710 for communicating information to and from the processor 715. The processor 715 is for processing information and instructions. In one implementation, the present invention includes an INTEL® architecture microprocessor as the processor 715; however, the present invention may utilize any type of microprocessor architecture. In one embodiment, the processor bus 710 includes address, data and control buses. The system 700 also includes a random access memory (RAM) 725 and memory controller 727 coupled with the processor bus 710 for storing information and instructions for the processor 715.

A bridge 750 is also coupled to the processor bus 710 for coupling the processor bus 710 to one or more additional, typically I/O, buses. In one embodiment, this bus is a Peripheral Component Interconnect (PCI) bus 755. The PCI bus bridge 750 couples the processor bus 710 to the PCI bus 755. A display device 762 is coupled to the PCI bus 755 for displaying information to the computer user. The display device 762 may be a liquid crystal device, cathode ray tube, or other display device suitable for creating graphic images and alphanumeric characters (and ideographic character sets) recognizable to the user. Additionally, a mass storage device 760 such as a magnetic or optical disk and disk drive is coupled with the PCI bus 755 for storing information and instructions for the processor 715.

In one embodiment, the PCI bus 755 is also coupled to an Extended Industry Standard Architecture (EISA) bus 735 via an EISA bus bridge 730. A read only memory (ROM) 740 is coupled with the EISA bus 735 for storing static information and instructions for the processor 715. I/O devices 765 are also coupled to the EISA bus 735 which input and output data and control information to and from the processor 715, and possibly other devices in the system 700. The I/O devices 765 can include, for example, an alphanumeric input device including alphanumeric and function keys, and a cursor control device. A hard copy device such as a plotter or printer may also be included in the I/O devices 765 for providing a visual representation of computer images, or a network adapter device may be included in the I/O devices 765 for coupling the system 700 to a computer network, such as the network 101 of FIG. 1.

It is to be appreciated that certain implementations of the system 700 may include additional processors or other components, such as additional PCI buses and bus bridges. Furthermore, certain implementations of the present invention may not require nor include all of the above components. For example, the system 700 may not include display device 762. Alternatively, the system 700 may not include an EISA bus 735 and EISA bus bridge 730.

In the discussions above, the computer system 200 of FIG. 2 and the network 101 of FIG. 1 are discussed as using the Windows®NT operating system. However, it is to be appreciated that alternate operating systems that include capabilities analogous to the event log and the registry discussed above can be used with the present invention.

Also in the discussions above, the selection of the search criteria for the filters 256 is discussed as being based on inputs by a system user. However, in alternate embodiments the search criteria for the filters 256 can be selected in any of a wide variety of conventional manners. For example, the search criteria may be coded in the software of the event monitoring utility. By way of another example, additional configuration software may be included that, upon execution, stores predetermined search criteria in the filters 256.

In one embodiment of the present invention, the configuration utility 252 and the event monitoring utility 254 discussed above are implemented as a series of software routines run by the computer system of FIG. 7. These software routines comprise a plurality or series of instructions to be executed by a processor in a computer system, such as the processor 715 of FIG. 7. Initially, the series of instructions are stored on a storage device, such as the mass storage device 760 of FIG. 7. When the event log forwarder is invoked, the instructions are copied from the storage device 760 into the memory 725, and then accessed and executed by the processor 715. In one implementation, these software routines are written in the C++ programming language. It is to be appreciated, however, that these routines may be implemented in any of a wide variety of programming languages. In an alternate embodiment, the present invention is implemented in discrete hardware or firmware.

In the discussions above, the configuration utility 252 of FIG. 2 is discussed as obtaining all of the messages from the computer system prior to receiving selections from a user. It is to be appreciated that alternate embodiments of the present invention do not use such ordering. For example, in one alternate embodiment, the configuration utility 252 provides a list of the available event logs on the computer system. Then, once a particular event log has been selected, the configuration utility 252 accesses the operating system to identify the software applications corresponding to that event log. Then, once a particular software application(s) has been selected, the configuration utility 252 accesses the msg.dll of the selected software application(s) to identify the available events which can be monitored.

Thus, the present invention provides an event log forwarder which automatically monitors events in a computer system for a particular event(s). Upon detecting the particular event(s), the event log forwarder outputs an indication of the particular event(s). The event log forwarder checks for events at predetermined intervals, thereby providing a continual event monitor.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, an event log forwarder has been described.

What is claimed is:

1. A computer-implemented method of monitoring events in a computer system, the method comprising the steps of:
   (a) accessing a set of one or more filters;
   (b) checking whether a new event in one or more event logs updated as a function of an operating system executing on the computer system satisfies the set of one or more filters;
   (c) providing an indication if there is a new event which satisfies the set of one or more filters; and
   (d) automatically repeating the checking step (b) and the providing step (c) at periodic intervals.

2. The method of claim 1, wherein the set of one or more filters includes one or more inclusive filters.

3. The method of claim 1, wherein the set of one or more filters includes one or more exclusive filters.

4. The method of claim 1, wherein the providing step (c) comprises providing the indication to a simple network management protocol (SNMP) console.

5. The method of claim 1, wherein the system includes a plurality of computer systems and wherein the set of one or more filters indicates a particular one of the plurality of computer systems.

6. The method of claim 1, wherein the set of one or more filters indicates a particular one of multiple applications executing on the system.

7. The method of claim 1, further comprising the steps of:

receiving an indication of the set of one or more filters; and storing the set of one or more filters.

8. A computer-implemented method of identifying events to be monitored in a computer system, the method comprising the steps of:

(a) receiving an indication of an event log updated as a function of an operating system executing on the computer system;

(b) receiving an indication of an application;

(c) receiving an indication of an event; and (d) storing the event log, the application, and the event as a filter in the system.

9. The method of claim 8, further comprising the step of repeating steps (a)–(c) for subsequent filters.

10. A computer-readable medium having stored thereon a plurality of instructions, the plurality of instructions including instructions which, when executed by a processor, result in:

(a) accessing a set of one or more filters;

(b) checking whether a new event in one or more event logs updated as a function of an operating system executing on a computer system satisfies the set of one or more filters;

(c) providing an indication if there is a new event which satisfies the set of one or more filters; and (d) automatically repeating the checking step (b) and the providing step (c) at periodic intervals.

11. The computer-readable medium of claim 10, wherein the providing step (c) comprises providing the indication to a simple network management protocol (SNMP) console.

12. The computer-readable medium of claim 10, wherein the computer-readable medium is coupled to a plurality of computer systems, and wherein the set of one or more filters indicates a particular one of the plurality of computer systems.

13. The computer-readable medium of claim 10, wherein the set of one or more filters indicates a particular one of multiple applications executing on a computer system coupled to the computer-readable medium.

14. The computer-readable medium of claim 10, further comprising instructions which, when executed, result in:

receiving an indication of the set of one or more filters; and storing the set of one or more filters.

15. An apparatus comprising:

a storage device which stores a set of one or more filters; and a processor, coupled to the storage device, to access the set of one or more filters, to check whether a new event in one or more event logs updated as a function of the apparatus satisfies the set of one or more filters, to provide an indication if there is a new event which satisfies the set of one or more filters, and to automatically re-check the one or more event logs for the new event at periodic intervals.

16. The apparatus of claim 15, wherein the processor is also to provide the indication to a simple network management protocol (SNMP) console.

17. The apparatus of claim 15, wherein the apparatus is coupled to a plurality of computer systems and wherein the set of one or more filters indicates a particular one of the plurality of computer systems.

18. The apparatus of claim 15, wherein the processor is also to receive an indication of the set of one or more filters and to store the set of one or more filters in the storage device.

19. An apparatus comprising:

means for accessing a set of one or more filters;

means for checking whether a new event in one or more event logs updated as a normal function of the apparatus satisfies the set of one or more filters;

means for providing an indication if there is a new event in the one or more event logs which satisfies the set of one or more filters; and means for automatically re-checking the one or more event logs for the new event at periodic intervals.

20. The apparatus of claim 19, wherein the apparatus is coupled to a plurality of computer systems and wherein the set of one or more filters indicates a particular one of the plurality of computer systems.

21. The apparatus of claim 19, further comprising:

means for receiving an indication of the set of one or more filters; and means for storing the set of one or more filters.

* * * * *